April 28, 1942.  E. O. MUELLER  2,280,965
LUBRICATION AND COOLING OF ANTIFRICTION BEARINGS
Original Filed Oct. 7, 1939
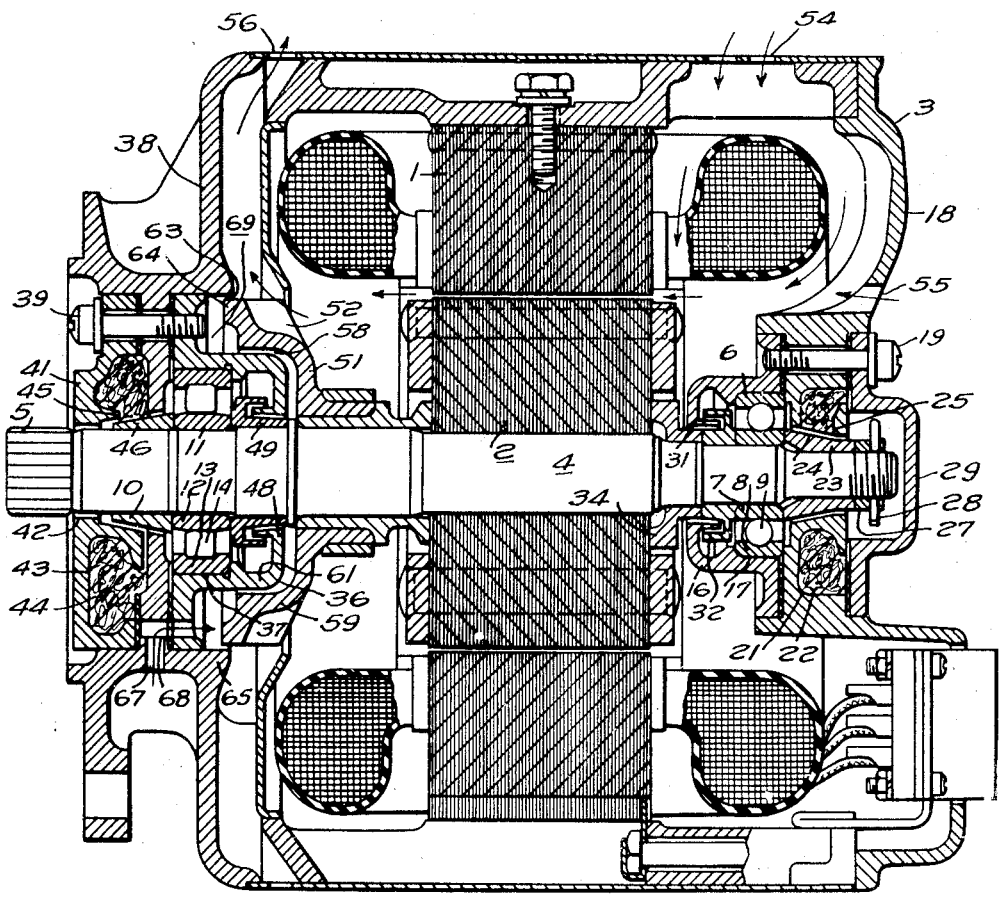
INVENTOR
*Erich O. Mueller*
BY
*O. B. Buchanan*
ATTORNEY Patented Apr. 28, 1942

2,280,965

UNITED STATES PATENT OFFICE 2,280,965

LUBRICATION AND COOLING OF ANTI-FRICTION BEARINGS

Erich O. Mueller, Irwin, Pa., assignor to Westinghouse Electric & Manufacturing Company, East Pittsburgh, Pa., a corporation of Pennsylvania Original application October 7, 1939, Serial No. 298,463. Divided and this application March 9, 1940, Serial No. 323,210

4 Claims. (Cl. 171—252)

This application is a division of my copending application Serial No. 298,463, filed October 7, 1939, the claims of which are directed to a lubrication arrangement of general application in high-speed antifriction bearings.

My invention relates to bearings for electric motors or other machines, and it has particular relation to bearings for machines running at very high speeds, such as speeds of from 10,000 R. P. M. to 48,000 R. P. M., such as high-frequency induction motors.

One of the objects of my invention is to produce adequate lubrication for the ball and roller bearings of 400-cycle, 24,000 R. P. M., aircraft motors which are required to run at extremely changeable outside temperatures, and to run continuously for three weeks without the addition of any lubricant and with the machine mounted in any conceivable position. These conditions are very severe. Grease could not be used for the lubricant, because there is no available grease that will work at the required temperature-range of −30° C. to +80° C., and because of the well-nigh impossibility of packing the bearings with just precisely the right amount of grease, while allowing for a reasonable efficiency and good starting conditions of high-speed motors with low horsepower ratings. Oil lubrication, applied in the ordinary way with free oil present in the bearing-enclosures, would also not solve the problem, since the bearing-seals could not be made so that free oil would not run out, with the motors turned in any position, and also because any appreciable amount of oil, in the bearings proper, would cause excessive churning and heating of the oil, driving practically all of the oil off, in vapor form, immediately after the starting of the motor.

The amount of oil which is needed in the lubrication of antifriction bearings is very small— just enough to maintain an oil-film. Experiments have shown that a drop of oil will maintain the oil-film for several hours, particularly where means are provided for supplying said oil in the form of an oil-vapor or mist which will permeate the space between the inner and outer races of the antifriction bearing proper, suitable oil-seals being provided for retaining the oil-vapor or mist within the bearing-enclosure in any possible operating-position of the apparatus.

The principal object of my present invention is to provide a combined bearing and ventilating assembly, in which a fan is utilized for producing a movement of air within the machine-enclosure, for ventilating purposes, and in which the fan-suction in the vicinity of the bearing is broken up by means of vent-holes and seals.

With the foregoing and other objects in view, my invention consists in the parts, structures, machines, assemblies and methods hereinafter described and claimed, and illustrated in the accompanying drawing, the single figure of which is a longitudinal sectional view of a motor embodying my invention in a preferred form of construction.

The illustrated motor is a 400-cycle, 24,000 R. P. M. aircraft motor comprising a stationary primary-winding member 1 and a squirrel-cage rotor-member 2 mounted in cooperative relationship, the stator-member 1 being mounted within an enclosing machine-frame or casing 3, and the rotor-member 2 being mounted on a shaft 4. The rear end of the shaft 4 extends outside of the casing 3, as indicated at 5, to drive any desired mechanism. The opposite, or front, end of the shaft 4 is shown as being supported and aligned by a light series ball bearing 6, although it might be a roller bearing designed to take thrust. The illustrated ball bearing 6 comprises inner and outer races 7 and 8, respectively, with a plurality of balls 9 therebetween. The rear, or driving, end of the shaft 4 is mounted in a light series roller bearing 11 comprising inner and outer races 12 and 13, respectively, with a plurality of rollers 14 therebetween. The rear-end roller-bearing 11 permits free longitudinal expansion of the shaft 4, and takes care of manufacturing tolerances lengthwise.

The ball bearing 6 at the front end of the machine is mounted in a steel bearing-cap 16, which is to say, that the outer race 8 is pressed within a suitable seat 17 in the bearing-cap 16, the inner race 7 being pressed upon the shaft 4. The bearing-cap 16 is bolted to the front end-bracket 18 of the motor, by means of bolts 19. The center portion of the front end-bracket 18 also serves as the bearing-housing, being provided with a small, shaft-encircling oil-reservoir space 21, which is filled with a wick 22 which is preferably a multiple-strand, loose-twist, long-fibre, wool yarn of good quality. The wick-filled oil-reservoir chamber 21 of the front bearing-assembly surrounds an oil-carrying collar 23 which is carried by the shaft 4 adjacent to the outer end of the ball bearing 6, that is, the end of the ball bearing 6 which is furthest away from the motor-rotor 2. The oil-carrying collar 23 is tapered or thickened, as indicated at 24, at its inner end, or the end adjacent to the ball bearing 6. The wick 22 passes through a window 25 into engagement with the oil-carrying collar 23, so as to maintain a thin film of oil on this collar, and the tapered construction of the collar causes the strong centrifugal force, resulting from the high speed of operation of the motor, to carry the oil-film toward the tapered end, where it is thrown off and vaporized, or converted into an oil-mist or spray, because of the extremely high speed of operation of the motor.

The oil-carrying collar 23 is retained on the front end of the shaft 4 by means of a nut 27 which may be locked in place by means of a cotter-pin 28. The entire front end of the bearing-assembly at the front end of the motor is enclosed by means of an aluminum, magnesium or other light-weight metal bearing-cap 29 which is bolted to the end-bracket 3 by means of the previously mentioned bolts 19.

The bearing-cap 16, at the inside end of the bearing-assembly at the front end of the motor, by "inside" meaning at the end of the bearing 6 closest to the motor-rotor 2, is provided with a re-entrant inner end-portion 31 which is shaped to provide close clearance with a steel oil-thrower 32 which is mounted on the shaft 4, so as to provide an oil-sealing means which substantially prevents the escape of the oil-mist from the bearing-assembly, no matter in what position the motor operates. The re-entrant inner end-portion 31 also serves as a cup to hold any liquid oil that tends to escape when the shaft is vertical.

The front bearing-assembly and the rotor-core 2 are held in place on the shaft 4 by means of a steel core-retainer 34 which is disposed on the shaft 4, between the rotor-core 2 and the oil-thrower 32, so that axial pressure is transmitted, along the shaft, from the rotor-core 2, through the core-retainer 34, the oil-thrower 32, the inner race 7, and the tapered collar 23, to the nut 27 on the front end of the shaft.

The roller bearing 11, at the rear or driving end of the motor-shaft 4, is mounted within a steel-bearing-cap 36, which is to say, that the outer race 13 is held within a suitable seat 37 which is provided in the bearing-cap 36, the inner race 12 being seated on the shaft 4. The bearing-cap 36 is bolted to the rear end-bracket 38 of the motor, as indicated at 39. The outer or rear end of the rear-end bearing-assembly is completed by a bearing-cap 41, of an aluminum, magnesium or other light-weight metal alloy, which is bolted to the end-bracket 38 by means of the aforesaid bolts 39. The driving shaft-end 5 extends out through an opening 42 in the rear bearing-cap 41. This rear bearing-cap 41 is also shaped to provide a small, shaft-encircling oil-reservoir space 43 which is substantially filled with a wick 44, as previously described for the front end-bearing, said wick pressing, through a window 45, into engagement with a tapered oil-carrying collar 46 which is pressed on the shaft 4, with the thick end of the collar 46 adjacent to the inner race 12 of the roller bearing 11, so as to operate by delivering a very small quantity of oil, in the form of a vapor or mist, to the bearing proper 11, as previously described in connection with the front end-bearing 6. The inner end of the bearing-cap 36 of the rear-end bearing-assembly terminates in an inner portion 48 which cooperates with a steel oil-thrower 49 to provide a close-running oil-seal similar to the oil-seal 31—32 for the front end-bearing.

From the construction thus far described, it will be apparent that I have provided a solution for the difficult lubricating-problem which was presented in connection with motors of the illustrated class, which were required to operate at extremely high speeds, over an extremely wide range of outside-air temperature-conditions, with the motor mounted in any possible position, and without re-lubrication during three weeks continuous running. Experiments and actual use have thoroughly demonstrated the successfulness of my lubricating means, to accomplish all of the intended purposes.

In accordance with my invention, the rear-end bearing-assembly is associated with a dished, imperforate fan-supporting spider or air-guiding member 51 which is carried by the shaft 4 adjacent to the oil-thrower 49, said fan-member 51 carrying small, inwardly projecting fan-blades 52 which serve to create a movement of the air, or other ventilating fluid, within the motor-casing 3. As indicated by the arrows, the ventilating air for the motor is drawn into the casing 3 through air-intakes 54 and 55 at the front end of the motor, and discharged at air-outlets 56 at the rear end. Because of the extremely high speed of operation of the motor, the fan 51—52 can be of an extremely small size, as indicated.

In order to prevent the fan-suction from drawing the oil-mist out of the rear-end bearing-assembly which is close to the fan-supporting member 51, I provide a narrow, substantially cylindrical, clearance-space or close-running seal 58, between an intermediate portion 59 of the fan-supporting member 51, and an intermediate portion 61 of the bearing-cap 36. For the same purpose, I may also provide a similar narrow, substantially cylindrical, clearance-space or close-running seal 63 between the outer end 64 of the fan-member 51 and an annular shoulder 65 which is provided on the rear end-bracket 38.

In order to further break up the fan-suction around the rear-end bearing-assembly, I provide a plurality of air-vent holes 67 and 68 in the rear end-bracket 38 and in the bearing-cap 36, so as to provide an air-communication from outside of the motor-frame 3 to a space 69 between the fan and the bearing, and between the two close-running seals 58 and 63.

While I have described and illustrated my invention in connection with a single illustrative form of embodiment, which is at present preferred by me, I desire it to be understood that such description and illustration are only illustrative, insofar as the broader principles of my invention are concerned, as various changes may be made by those skilled in the art. I desire, therefore, that the appended claims shall be accorded the broadest construction consistent with their language and the prior art.

I claim as my invention:

1. A combined bearing and ventilating assembly for one end of a machine having an enclosing, relatively stationary casing and an enclosed, relatively stationary stator-member therein, a relatively rotating shaft which is supported, at one end, in said combined bearing and ventilating assembly, and a rotor-member carried by said shaft in cooperative relation to said stator-member, said combined bearing and ventilating assembly comprising a casing-supported bearing-housing having its inner end-portion extending into a close-running oil-sealing relation to the shaft, a lubricated, shaft-supporting bearing-member within said bearing-housing, a shaft-supported, dished, imperforate fan-supporting member disposed in spaced relation to said inner end-portion of the bearing-housing, and a plurality of fan-blades projecting inwardly from said fan-supporting member for causing a movement of a ventilating fluid within the casing of the machine, said assembly being characterized by a narrow, close-running clearance-space between a portion of said dished fan-supporting member and a part of said bearing-housing for impeding the suction of the ventilating fluid from said close-running oil-seal between said inner end-portion of the bearing-housing and the shaft, and means for providing inlet-means for admitting ventilating fluid by-passing the bearing and communicating from outside of the machine-casing to a space between the fan-supporting member and the bearing-housing, and between the narrow, close-running clearance-space and the close-running oil-seal.

2. A combined bearing and ventilating assembly for one end of a machine having an enclosing, relatively stationary casing and an enclosed, relatively stationary stator-member therein, a relatively rotating shaft which is supported, at one end, in said combined bearing and ventilating assembly, and a rotor-member carried by said shaft in cooperative relation to said stator-member, said combined bearing and ventilating assembly comprising a casing-supported bearing-housing having its inner end-portion extending into a close-running oil-sealing relation to the shaft, a lubricated, shaft-supporting bearing-member within said bearing-housing, a shaft-supported, dished, imperforate fan-supporting member disposed in spaced relation to said inner end-portion of the bearing-housing, and a plurality of fan-blades projecting inwardly from said fan-supporting member for causing a movement of a ventilating fluid within the casing of the machine, said assembly being characterized by two separated, narrow, close-running clearance-spaces between two different portions of said dished fan-supporting member and two different portions of said bearing-housing, respectively, for impeding the suction of the ventilating fluid from said close-running oil-seal between said inner end-portion of the bearing-housing and the shaft, and means for providing inlet means for admitting ventilating fluid by-passing the bearing and communicating from outside of the machine-casing to the space between said narrow clearance-spaces.

3. A combined bearing and ventilating assembly for one end of a machine having an enclosing, relatively stationary casing and an enclosed, relatively stationary stator-member therein, a relatively rotating shaft which is supported, at one end, in said combined bearing and ventilating assembly, and a rotor-member carried by said shaft in cooperative relation to said stator-member, said combined bearing and ventilating assembly comprising a stationary bearing-housing, a bearing therein, means within said bearing-housing for supplying oil to the bearing in the form of an oil-vapor or mist, oil-sealing means for retaining the oil-vapor or mist within the bearing, said oil-sealing means including an inner end-portion of the bearing-housing extending into a close-running oil-sealing relation to the shaft, a shaft-supported, dished, imperforate fan-supporting member disposed in spaced relation to said inner end-portion of the bearing-housing, and a plurality of fan-blades projecting inwardly from said fan-supporting member for causing a movement of a ventilating fluid within the casing of the machine, said assembly being characterized by a narrow, close-running clearance-space between a portion of said dished fan-supporting member and a part of said bearing-housing for impeding the suction of the ventilating fluid from said close-running oil-seal between said inner end-portion of the bearing-housing and the shaft, and means for providing inlet-means for admitting ventilating fluid by-passing the bearing and communicating from outside of the machine-casing to a space between the fan-supporting member and the bearing-housing, and between the narrow, close-running clearance-space and the close-running oil-seal.

4. A combined bearing and ventilating assembly for one end of a machine having an enclosing, relatively stationary casing and an enclosed, relatively stationary stator-member therein, a relatively rotating shaft which is supported, at one end, in said combined bearing and ventilating assembly, and a rotor-member carried by said shaft in cooperative relation to said stator-member, said combined bearing and ventilating assembly comprising a stationary bearing-housing, a bearing therein, means within said bearing-housing for supplying oil to the bearing in the form of an oil-vapor or mist, oil-sealing means for retaining the oil-vapor or mist within the bearing, said oil-sealing means including an inner end-portion of the bearing-housing extending into a close-running oil-sealing relation to the shaft, a shaft-supported, dished, imperforate fan-supporting member disposed in spaced relation to said inner end-portion of the bearing-housing, and a plurality of fan-blades projecting inwardly from said fan-supporting member for causing a movement of a ventilating fluid within the casing of the machine, said assembly being characterized by two separated, narrow, close-running clearance-spaces between two different portions of said dished fan-supporting member and two different portions of said bearing-housing, respectively, for impeding the suction of the ventilating fluid from said close-running oil-seal between said inner end-portion of the bearing-housing and the shaft, and means for providing inlet means for admitting ventilating fluid by-passing the space within the bearing-housing containing the oil-vapor or mist and communicating from outside of the machine-casing to the space between said narrow clearance-spaces.

ERICH O. MUELLER.